US012318743B2

(12) United States Patent
Walter et al.

(10) Patent No.: US 12,318,743 B2
(45) Date of Patent: Jun. 3, 2025

(54) POWDER BLENDER FOR A SYSTEM FOR CONTINUOUS PROCESSING OF POWDER PRODUCTS

(71) Applicant: Fette Compacting GmbH, Schwarzenbek (DE)

(72) Inventors: Nicolas Walter, Hamburg (DE); Marten Klukkert, Hamburg (DE); Wouter Emiel Grymonpré, Sint-Michiels (BE); Sven Kolbe, Buechen (DE); Joris Vanderputten, Buizingen (BE); Jozef Verheyen, Mortsel (BE); Anna Novikova, Hamburg (DE); Jurgen Boeckx, Steenokkerzeel (BE); Kris Schoeters, Kessel-Lo (BE); Jan Vogeleer, Bornem (BE)

(73) Assignee: FETTE COMPACTING GMBH, Schwarzenbek (DE)

( * ) Notice: Subject to any disclaimer, the term of this patent is extended or adjusted under 35 U.S.C. 154(b) by 691 days.

(21) Appl. No.: 17/533,368

(22) Filed: Nov. 23, 2021

(65) Prior Publication Data

US 2022/0161207 A1 May 26, 2022

(30) Foreign Application Priority Data

Nov. 26, 2020 (EP) .................................... 20210022

(51) Int. Cl.
*B01F 27/00* (2022.01)
*B01F 27/1143* (2022.01)
(Continued)

(52) U.S. Cl.
CPC ........ *B01F 27/1143* (2022.01); *B01F 27/703* (2022.01); *B01F 27/705* (2022.01)

(58) Field of Classification Search
CPC ... B01F 27/703; B01F 27/705; B01F 27/1143
See application file for complete search history.

(56) References Cited

U.S. PATENT DOCUMENTS 1,017,820 A 2/1912 Svebilius
3,924,835 A 12/1975 Hohnfeld et al.
(Continued)

FOREIGN PATENT DOCUMENTS

CH 694015 A5 6/2004
CN 1647850 A 8/2005
(Continued)

OTHER PUBLICATIONS

JPH09315548 Machine Translation (Year: 1997).*
(Continued)

*Primary Examiner* — Anshu Bhatia
(74) *Attorney, Agent, or Firm* — Barclay Damon LLP

(57) ABSTRACT

A powder blender for a system for continuous processing of powder products comprises a horizontal blending tube extending along an axis from a first end to a second end. The horizontal blending tube comprises at least one inlet configured to receive the powder products to be blended, and at least one outlet configured to discharge the powder products after blending. At least two blending devices are positioned in the blending tube and arranged successively along the axis of the blending tube. At least two actuators, wherein each of the at least two actuators is configured to operate one of the at least two blending devices such that the at least two blending devices are actuated differently from each other.

18 Claims, 4 Drawing Sheets

(51) Int. Cl.
*B01F 27/703* (2022.01)
*B01F 27/705* (2022.01)

(56) References Cited

U.S. PATENT DOCUMENTS

| | | | |
|---|---|---|---|
| 3,941,689 A | 3/1976 | Hirayama et al. | |
| 4,786,001 A | 11/1988 | Ephraim et al. | |
| 5,887,976 A | 3/1999 | Komori et al. | |
| 6,109,478 A | 8/2000 | Blenkinsop et al. | |
| 6,969,491 B1 | 11/2005 | Marx et al. | |
| 2004/0076073 A1 | 4/2004 | Yao et al. | |
| 2011/0198197 A1 | 8/2011 | Blickley et al. | |
| 2018/0036912 A1* | 2/2018 | Dubey | B28C 5/1284 |

FOREIGN PATENT DOCUMENTS

| | | | |
|---|---|---|---|
| CN | 111775325 | A | 10/2020 |
| DE | 2248851 | B1 | 9/1973 |
| DE | 102008012154 | A1 | 9/2009 |
| EP | 1800736 | A2 | 6/2007 |
| EP | 1800736 | A3 | 6/2007 |
| EP | 2427166 | A1 | 3/2012 |
| EP | 3013571 | | 12/2014 |
| EP | 3363609 | A1 | 8/2018 |
| FR | 2641625 | A1 | 7/1990 |
| FR | 2782937 | A1 | 3/2000 |
| GB | 255055 | A | 11/2017 |
| JP | S51003470 | U | 1/1976 |
| JP | 55-99327 | | 7/1980 |
| JP | H01167325 | U | 11/1989 |
| JP | H04057230 | U | 5/1992 |
| JP | H09-315548 | A | 12/1997 |
| JP | H09313910 | A | 12/1997 |
| JP | 45-28475 | A | 3/2003 |
| JP | 2004162436 | A | 6/2004 |
| JP | 2006334566 | A | 12/2006 |
| JP | 2011136256 | A | 7/2011 |
| JP | 2014054583 | A | 3/2014 |
| SU | 1200967 | A1 | 12/1985 |
| WO | 2014/049098 | A2 | 4/2014 |
| WO | 2014/049098 | A3 | 4/2014 |
| WO | 2014/207510 | A1 | 12/2014 |
| WO | WO2016/149725 | A1 | 9/2016 |
| WO | 2019217932 | A1 | 11/2019 |

OTHER PUBLICATIONS

JP Application No. 2021190109; filed Nov. 24, 2021; Office Action dated Mar. 13, 2024 (6 pages).

IN Application No. 202114053971, Examination Report dated Apr. 13, 2023 (9 pages).

JP Application No. 2021190109; filed Nov. 24, 2021; Office Action dated Jul. 21, 2023 (4 pages).

* cited by examiner

POWDER BLENDER FOR A SYSTEM FOR CONTINUOUS PROCESSING OF POWDER PRODUCTS

CROSS REFERENCE TO RELATED APPLICATIONS

This application is based upon and claims priority to, under relevant sections of 35 U.S.C. § 119, European Patent Application No. 20 210 022.8, filed Nov. 26, 2020, the entire contents of which are hereby incorporated by reference.

FIELD OF TECHNOLOGY

The disclosure pertains to a powder blender for a system for continuous processing of powder products, the powder blender comprising a horizontal blending tube, having at least one inlet for powder products to be blended in the blending tube, and having at least one outlet for discharging blended powder products. The disclosure also pertains to a feeding and blending system for a system for continuous processing of powder products and to a system for continuous processing of powder products.

BACKGROUND

Solid dosage forms or oral solid dosages (OSD), such as tablets or capsules, can be produced for example in tablet presses, for example rotary tablet presses, or capsule filling machines. In continuous production lines a powder mixture of for example at least one active pharmaceutical ingredient (API) and at least one excipient is continuously provided by a blending device and fed for example to the tablet press or the capsule filling machine. The powder products to be mixed in the blending device can be provided continuously at inlets of the continuous production line. Feeding and dosing devices can be provided for feeding and dosing the ingredients to be processed. Such a production process is also referred to as a direct processing or, in particular with regard to tablet presses, direct compression process, in contrast to a granulation process where additional devices and process steps are employed, such as dry or wet granulators, and potentially dryers, to improve the processability, such as flowability or compressibility, of a product not suited for direct processing or to avoid segregation of the product mixture.

A system and method for continuous production of solid dosage forms are known for example from EP 2 427 166 B1 or EP 3 013 571 A1. Systems of the type in question usually comprise a feeding and blending system for feeding different powder products to a powder blender and blending the powder products to a product mixture which is subsequently processed in a production machine of the system for continuous processing of powder products. In practice, often more than two feeding and dosing devices with more than two feeders are provided since often more than two powder products shall be mixed in the powder blending device, for example one or more active pharmaceutical ingredients (API), one or more excipients and/or one or more lubricants.

For systems for continuous processing of powder products powder blenders are known comprising horizontal blending tubes. The tubes have at least one inlet for different powder products to be blended in the blending tube. For blending, a blending device is arranged in the blending tube, for example a blending screw which is rotated by a corresponding drive, such as an electric motor, about its longitudinal axis. The blended product mixture is subsequently discharged via an outlet of the powder blender.

It is an object of the present invention to provide a powder blender, a feeding and blending system, and a system for continuous processing of powder products providing high flexibility with regard to different blending processes, and at the same time achieving optimum blend uniformity and homogeneity.

BRIEF SUMMARY OF THE INVENTION

For a powder blender of the above-mentioned type the invention solves the object in that in the blending tube at least two blending devices are arranged successively along a longitudinal axis of the blending tube, and in that at least two actuators are provided for actuating the at least two blending devices differently from one another, preferably independently from one another.

In an embodiment, the powder blender blends powder products for processing in a corresponding system. In this system, for example solid dosage forms may be produced. The solid dosage forms may in particular be oral solid dosages (OSD). They can be produced from for example dry powder products fed into the system through system inlets. The inventive powder blender may also feed for example a granulator. The invention may pertain to a direct processing system. In particular in systems including a tablet press this is also referred to as a direct compression system. In the powder blender powder products, such as one or more active pharmaceutical ingredients (API), one or more excipients and/or one or more lubricants are blended, preferably continuously. The powder blender may be a continuous powder blender and may for example be a dry powder blender. The product mixture produced in the powder blender may thus be a dry powder product mixture. The dry powder product mixture may be a non-bonded dry powder product mixture or a bonded dry powder mixture, bonded by either a dry agglomeration, or a dry aggregation or a dry granulation process. The powder blender may also include a liquid addition, for small liquid additions, to have also a dry agglomeration process and/or a dry aggregation process and/or a dry granulation process, for instance a moisture activated dry granulation process. In this way an even more advantageous flexibility is achieved, by combining a dry powder blending process with a dry agglomeration and/or a dry aggregation and/or a dry granulation process, to not only create a dry powder mixture, but also increase the particle size of the mixture, without the need of using a wet granulation process with its disadvantageous necessary drying process step. Increased particle size in turn can improve on the dry powder mixture quality like increased flowability, prevention of segregation in the blender or blend conveyor or subsequent process steps, less dust, reduced product losses by the dust extraction systems of the dosing and blending system, a tablet press or a capsule filling machine. Directly following the blending step solid dosage forms may be continuously produced in a production machine, for example tablets by compression of the powder products in a tablet press. Also, the product mixture produced in the powder blender can be fed to a granulator, for example a wet granulator, or to an intermediate bulk container (IBC). The inventive powder blender, the inventive feeding and blending system, as well as the inventive system for processing of powder products may be continuous systems. This includes the possibility of intermittent process components of process steps included in the inventive systems.

The powder blender may be any type of for example continuously operating blending device, where infeed and outfeed are preferably continuous product streams. This includes the possibility of intermittent process components or process steps, like fast intermittent process components or process steps, included in the inventive system and method. This could for example include mini-batch blending or a mini-batch blender. The inlet or the inlets of the blending device can be provided at the upper side of the blending tube. The outlet can be arranged at the lower side of the blending tube. However, it would also be feasible to provide an inlet and/or an outlet at a side of the blending tube.

In an embodiment, the powder blender has an essentially horizontal blending tube, i.e. a tube whose longitudinal axis runs essentially along a horizontal line, when the powder blender is installed for operation. The essentially horizontal set-up of the blending tube refers to the normal or steady operation state of the blending tube. The blending tube may be movable such that for example during a start-up phase of the operation the blending tube may be inclined to improve on the blend uniformity and/or homogeneity of the powder blend at the start of the operation. Likewise, the blender tube can also be declined for example during the shut-down phase of the operation, to ensure a better emptying of the blender tube at the end of the operation. In the blending tube different powder products are blended.

In an embodiment, at least two blending devices are arranged successively in the blending tube along the longitudinal axis of the blending tube, thereby defining at least two mixing zones successively arranged in the longitudinal direction of the blending tube. In an embodiment, at least two actuators are provided for actuating the at least two blending devices differently from one another, preferably independently from one another. The at least two actuators may for example comprise actuators for actuating the at least two blending devices with different speeds and/or blending intensities. This different actuation can have a fixed relation, for example if one of the actuators is a drive for driving the two blending devices and one actuator is a gear for providing different speeds for the two commonly driven blending devices. Such a gear could be adjustable or exchangeable to provide different relations between the speeds of the two blending devices. For better adjustability for example also during a production process it is preferred, however, if the at least two actuators are designed to actuate the at least two blending devices independently from one another. To this end, the at least two actuators may be at least two drives for driving the at least two blending devices independently from one another. The powder blender may comprise a control unit designed to control at least the actuators of the blending devices and operation of the powder blender. This control may be carried out for example based on measurement results of sensors detecting certain defined operational parameters and/or certain quality attributes of the blend, like for example the speeds of the actuators, or the torques generated by the actuators, or the mean residence time of the blended powder inside the blender tube, or the blend uniformity measured inside the blender tube, or at the outlet of the blender tube, or the mass of the powder inside the blender or the uniformity of the blend.

Actuators can induce a rotation motion, like an electric, electro-magnetic, magnetostrictive, piezo-electric or pneumatic rotation motor, or actuators can induce a linear motion, like an electric, electro-magnetic, magnetostrictive, piezo-electric or pneumatic linear motor. The rotational motion can be continuous. A rotational motion can also include a vibration of the rotation motion, superimposed on the continuous motion, to improve the blend uniformity even further. A linear motion, when used in a powder blender can be a vibration linear motion, also known as a linear vibration, that generates a net forward motion of the powder in the blending tube, while at the same time generating a blending action.

In an embodiment, the powder blender provides for a high flexibility with regard to the blending process. By individually controlling for example the rotational speed of the two successively arranged blending devices and/or by selecting for example a different blending blade configuration for each of successively arranged blending shafts, desired blending processes can be chosen flexibly and in a targeted manner. In this way blending performance can be optimized for different processes, in particular different powder products. This is achieved by providing two blending zones in-line and successively along the longitudinal axis of the blending tube in the blending tube. A uniform distribution and dispersion of all blending ingredients can be achieved to guarantee an optimum blend uniformity and homogeneity. For example, potential feeding fluctuations of feeders arranged upstream of the powder blender, feeding the powder products into the blender, which would disadvantageously affect the blend homogeneity, can be most optimally counteracted according to the invention and thus dampened out. One generic design of the powder blender is suitable for a broad range of blending processes, in particular of ingredients with various properties. The blending result can be optimized in a flexible manner, for example by providing inlet ports in the second blending zone, and by adjusting the operational parameters of the second blending zone.

An embodiment of a blending process optimally consist firstly of a high shear blending process that breaks up agglomerates of the single ingredients and ensures a good dispersion of the single ingredients. In the first step small agglomerates of the individual powder ingredients are cut up, to ensure homogeneous blending on a particle scale. This first step is followed as a second step by a low shear blending process that ensures a good distribution of the single ingredients into the powder blend. In the second step, the powder is partially moved back and forth to ensure a feed variability of feeders feeding different materials to the powder blender is evened out. Only by attaining both, a good dispersion and a good distribution of the single ingredients, the targeted optimal powder homogeneity can be reached. In a third step, again a higher shear can be induced, not on the single ingredients to create a dispersion, but of the dry powder mixture to create dry agglomerates, or dry aggregates, or dry granulates, either without or with a small liquid addition, but without a disadvantageous drying step.

By arranging two blending devices successively in the blending tube according to the invention, this optimal blending process can most advantageously be realized. For example, optimal operational parameters for the first high shear mixing process, like a high rotational speed of the blender shaft and cutting blades on the blender shaft, can be chosen to break up the agglomerates. Even more advantageously, the ingredient which has a tendency to from agglomerates can be dosed into a second inlet port of the blender tube, and the cutting blades can be positioned underneath the inlet port. By this embodiment a powder mill which would otherwise be needed to de-agglomerate, can be avoided. The second blending device can have operational parameters optimal for the second blending step, like the low shear blending process, like lower rotational speed of the blender shaft, or the high shear agglomeration or aggregation or granulation step, like a higher rotational speed of the blender shaft and pins or any other paddle geometry suitable for dry agglomeration, or dry aggregation or dry granulation. By adding two blending devices consecutively into one blender tube according to the invention, a simpler mechanical construction can be attained, with a more robust design with lower technical risks and lower costs. It also avoids disadvantageous connections of independent blenders to each other. Such blender connections bear a risk for demixing.

According to an embodiment the at least two blending devices may comprise at least two blending shafts which are rotated about their longitudinal axis by the at least two actuators. The at least two blending shafts are arranged along or parallel to the longitudinal axis of the blending tube, in particular successively along the longitudinal axis of the blending tube. The at least two blending shafts may furthermore each comprise blending blades for blending the powder products. The two blending devices may thus be blending screws. With these embodiments particularly good and even blending results can be achieved.

The blending screws can have different blade shapes, orientations and/or positions for optimally adapting the blending devices to a specific blending process. This gives high flexibility in enabling exactly the needed blending process for the given powder formulation. To further maximize flexibility, at least some of the blades may be adaptable with regard to their shape, orientation and/or position.

According to a further embodiment the at least two blending shafts are arranged coaxially. This embodiment leads to particularly small disturbances on the desired blending process. The at least two blending shafts may further be supported on each other at their ends facing towards each other, for example in the middle of the blending tube. For example, bearings or bushings can be provided at the intersection of the two blending shafts to support the two blending shafts on each other. The at least two blending shafts may preferably be arranged to rotate in opposite directions. By supporting the at least two blending shafts on each other, they do not need to be supported on the blending tube at their ends facing towards each other, for example in the middle of the blending tube. Such supports on the blending tube bear the risk of undesired powder accumulations and thus a disadvantageous blending result.

According to a further embodiment the blending shafts may be hollow and a central rod may be inserted into the two blending shafts to support the two blending shafts on each other. The central rod does not need to be connected with bearings to the blending shafts, but rather can be floating in the two blending shafts. By avoiding connections of the different elements of the two blending devices, an easier and much faster disassembly can be attained, needed for cleaning of the blending devices. By avoiding components such as bearings and seals that are typically needed to seal of the bearings from powder product, and that are also difficult to clean, an easier and better cleaning can be attained. A faster disassembly and easier cleaning of the powder blender components in turn enables a faster change-over from one powder mixture to another powder mixture.

By having the two blending shafts supported on each other, no stationary supporting elements from the blending shafts to the stationary blending tube, like support brackets, support rods or the like, are needed. Any stationery element between the blending shaft and blending tube is known as a possible cause of powder build-up and subsequent powder dislodge, which can lead to a non-uniformity and inhomogeneity in the powder mixture. Also, any stationary element between the blending shaft and blending tube can have a disadvantageous effect on a good dispersion and distribution of the powder products.

According to a further embodiment maximising flexibility in the blending process, the at least two actuators may be configured to actuate the rotational speed and/or the rotational direction of the at least two blending shafts differently from one another, preferably independently from one another.

According to a further embodiment maximizing flexibility, at least one of the blending shafts may be configurable and/or removable to be replaced with a different blending shaft. Configurable could mean for example that blending blades can be removed or their position and/or orientation be adapted. Making at least one of the blending shafts easily replaceable with a different blending shaft, for example by providing a quick release connection, further increases the range of blending processes which can be implemented with the powder blender.

According to a further embodiment, maximizing flexibility, the blender tube may be removable to be replaced with a different blender tube of different diameter. Also the first and/or second blending devices, for example the first and/or second blending shafts could be removable to be replaced with different first and/or second blending devices, for example first and/or second blending shafts. Any of the components of the powder blender, for example the blending tube and/or the first and/or second blending devices, may be arranged to be easily removable and replaceable without tools, allowing for easy change-over and easy cleaning or servicing.

By using for example larger diameters of the blending shafts and consequentially a larger blending tube diameter, higher blender blade tip speeds can be attained for a given rotational speed. Higher blender blade tip speeds can improve the deagglomeration and consequential dispersion of cohesive powder ingredients into the powder mixture. Higher blender blade tip speeds can also improve the dry agglomeration, or dry aggregation or dry granulation of the powder mixture. With this invention, it is very easy to use two different blending tube diameters. When for a certain powder mixture the dispersion of single ingredient needs improvement, a larger diameter for the first blending device to attain the desired powder dispersion first, before the second blender device, can be used. When for a certain powder mixture, dry agglomeration or dry aggregation or dry granulation is advantageous, a larger diameter for the second blending device, to attain the desired particle size, increase of the dry powder mixture bonds, after the first blending device, can be used. By using smaller diameters of the blending tube and consequentially smaller diameters for the blending shaft, a smaller hold-up volume and consequential hold-up mass (in kg) for the powder mixture can be attained, which gives a smaller throughput (in kg/min) while maintaining the desired residence time (in min) to ensure good powder blend quality. A smaller volume of the blending devices has an additional advantage of less product loss by powder remaining on blending device internal surfaces, and generally remaining in the blending devices bottom sides, at the end of a production campaign. This in turn makes the blending devices particularly suited for processing small quantities of powder mixture (as is typically needed in formulation development and clinical production, orphan drug manufacturing and future trending personalized medicines manufacturing) where a small product loss is essential. By using 2 blending devices arranged successively after each other according to the invention, it is very easy to use an optimal combination of two different blending tube diameters, to attain the above mentioned advantages.

In prior art systems for continuous blending it has been suggested to use a weir at the outlet of the blender to perform a controlled and faster start up from an empty blender. First, the blender is filled until the desired powder mass inside the blender is reached, when the weir opens. This shortens the time and reduces the amount of powder needed when starting with an empty blender, until a homogeneous blend is achieved. The advantage of two blending devices is that the second blending device can rotate in the opposite direction, serving as a weir to keep the powder away from the outlet until the desired mass of powder inside the blender is reached. Secondly, also during continuous operation, the mass of the powder in the second blending device can be controlled by independently adjusting the speed of the second blending shaft. The thereby adjustable powder mass in the second blending device is advantageous for the process, because the amount of powder inside the second blending device determines the amount of low shear blending.

According to a further embodiment, a first of the at least two blending devices may be arranged upstream of a second of the at least two blending devices, and between the first and second blending devices and/or downstream of the second blending device an adjustable overflow device may be arranged in the blending tube for allowing an adjustable mass of powder product to flow over the overflow device. The overflow device(s) may be for example be weir(s) or overflow plate(s) or overflow valve(s). One or more than one suitable actuator, for example drive, may be provided for actuating the overflow device, for example weir(s) or overflow plate(s) or overflow valve(s). With such overflow devices it is possible to adjust the mass independent of the blending shaft speed. Typically, a faster blending shaft speed (when for example a total average paddle angle is forward) will give a shorter powder residence time, and thereby a smaller powder mass in the blender for a given powder mass flow. The adjustable overflow device(s) allow for high blending shaft speeds, and the resulting high shear and/or high impact on the powder blend, while still being able to adjust the powder mass sufficiently high. Such overflow devices may not only be used at start-up of a production process but also be used intermittently in open and closed state, for example for a mini-batch blending or the like. For example, the overflow device may comprise at least one overflow plate, preferably at least two overflow plates, wherein at least one overflow plate is rotatable, and wherein the mass of powder product to flow over the overflow device is adjustable by rotating the at least one overflow plate. Of course, also both or all of the overflow plates may be rotatable, if more than one overflow plate is provided. Such overflow plate(s) may for example have a half circle shape. It would thus be possible to provide two adjustable overflow plates, positioned after each other and/or against each other at the same location in the blending tube. Such a double plate execution can act both as an adjustable overflow plate and a powder shut-off valve, with which powder flow can completely be shut off. It would for example be possible to use half circle plates for the overflow plates. When rotated against each other these two half circles can turn into one full circle plate, effectively closing off the blender tube.

As already explained the disclosed powder blender is suited for continuous production processes. However, the inventive powder blender is also specifically suited for semi-continuous or even non-continuous production processes. For example, the inventive powder blender is well suited for mini-batch blending. When using the inventive powder blender in semi-continuous or mini-batch mode, the blending tube and/or the blender outlet and/or a blender outlet hopper may be intermittently filled and emptied with powder product. Equally, when the blender inlet is shut-off during intermittent discharge of the blender, the blender inlet or blender inlet hopper/funnel may be intermittently filled and then emptied while charging the blender. The rising and falling powder levels cause pressure fluctuations inside the feeder outlets, thereby causing force fluctuations on the feeder, creating a disturbance on the signal of a loss-in-weight feeder, causing the loss-in-weight feeder to either dose powder inaccurately, give undesirable perturbations, or have the loss-in-weight feeder go into an alarm state when the perturbations exceed a certain limit. For mini-batch blending venting tubes may be provided at the inlet and the outlet of the blending tube. Also, in mini-batch blending operation a funnel or hopper feeding powder products to one or more than one inlets of the blending tube my serve as an inlet buffer. The same goes for a blender outlet hopper, which may serve as an outlet buffer. For mini-batch blending, the inlet(s) and/or the outlet of the powder blender may be provided with charge and/or discharge valves. These may be conventional valves, like butterfly, slide, ball or pinch valves, or the like, or for example the above explained shut-off valves using two rotatable overflow plates. These could thus be used as an adjustable overflow device and at the same time as a shut-off valve. It would also be possible to shut off powder conveying in the blending tube by rotating a first and/or second of the blending shafts backwards, for example with a helix or auger, or with backward pushing blending blades. A mini-batch blending step could advantageously be added only one time during the operation, namely at the start-up phase of the operation. At this start-up phase, the feeding and dosing devices effectively will also be used in a mini-batch mode, by starting the feeding and dosing devices, whereby the feeding and dosing devices will be filled with powder, and upon having dosed the exact required amount of powder into the first blending device, for this first mini-batch, the feeding and dosing devices will be stopped again. By using a mini-batch at the start-up phase in the above described way, a higher dosing accuracy of the individual ingredients at the start-up phase can be attained, with as a result lower start-up losses due to a non-uniform powder mixture. An additional advantage of the mini-batch mode at the start-up phase of the operation, is that the feeding and blending system is now filled with powder and has processed a first powder mixture, which is also known as priming a process system.

At least one inlet of the powder blender may be arranged at the upper side of the blending tube and/or the at least one outlet may be arranged at the lower side of the blending tube. Arranging the inlet(s) at the top of the blender tube allows powder products to enter the blending tube via gravity. In the same way, arranging the outlet(s) at the lower side of the blending tube allows the product mixture to be discharged from the blending tube via gravity. This leads to a particularly simple construction. The inlet or inlets and/or the outlet can be arranged with a longitudinal axis perpendicular to the longitudinal axis of the blending tube. In particular the inlet or inlets and/or the outlet can be arranged with a vertical longitudinal axis. However, the inlet or inlets and/or the outlet can also be arranged with an inclination to the vertical direction, for example under an angle to the vertical direction, for example around 10 to 30 degrees. Arranging inlets and/or outlets not fully vertical, but slightly inclined has as an advantage that the height of the powder blender can be reduced further.

Generally, it is possible that the blending tube comprises only one inlet arranged above a first of the at least two blending devices, for example when all powder products are fed through this one inlet. According to a further embodiment the blending tube may comprise at least two inlets, wherein at least one first inlet is arranged above a first of the at least two blending devices, and wherein at least one second inlet is arranged above a second of the at least two blending devices. If the second blending zone is used as a weir, it is also possible that product is only discharged into the first blending zone. In this manner different powder products can be subjected to different blending processes efficiently and in a targeted manner. The first blending device, and thus the first blending zone, could be arranged upstream of the second blending device, and thus the second blending zone, meaning powder products entering the blending tube will pass through the first blending device first and through second blending device second. The outlet of the blending tube is thus arranged in the second blending zone, where the second blending device is arranged, for example at the downstream end of the second blending zone. For example, API(s) and excipient(s) could be introduced into at least one first inlet, thus entering the first blending zone where the first blending device is arranged. For example, lubricant(s) could be introduced into at least one second inlet, thus entering the second blending zone. Of course, more than one first inlet and/or more than one second inlet may be provided. For example, two inlets could be provided above the first blending device, thus feeding powder products to the first blending zone, and/or two inlets could be provided above the second blending device, thus feeding powder products to the second blending zone, to further improve blending flexibility. This flexibility allows the process to be optimized specifically for the given formulation. Friable materials might be fed into the second blending device, whereby the first blending device is performing high shear blending of cohesive materials before both streams are blended gently together in the second blending device. There are a number of powder groups, requiring specific blending steps. For example, coated pellets, which are sensitive to mechanical stress, may have to be blended with another cohesive material and a reasonable flowing excipient, thus requiring first high shear micro mixing of the cohesive material with the reasonable flowing excipient after pellets are added for gentle mixing. This complex blending process can be carried out fully by the two blending devices according to the invention.

According to a further embodiment, the blending tube may have a ratio between its length and its diameter of at least five, preferably at least seven. Such a length to diameter ratio has proven to serve particularly efficient blending and lead to particularly even blending results.

The powder blender may further comprise at least one sensor, in particular a weight sensor, such as a load cell sensor, for measuring the mass of powder product in the blending tube. Such a weight sensor may for example be provided underneath the blending tube with the weight of the blending tube on the weight sensor determining the weight sensor measuring signal. Based on for example a previous calibration process it is possible to detect a potential accumulation of stagnant powder product in the blending tube, which is not blended properly. A control unit may be provided to control for example the actuators of the blending shafts to remove the accumulation of stagnant powder products and/or to control the mass in the blending tube, which determines the amount of back mixing and mixing intensity. To this end, the control unit could for example change the rotational speed and/or the rotational direction of at least one of the blending devices.

According to a further embodiment, the powder blender may be supported on a blender support essentially balanced, or at its center of gravity, without powder product present in the blending tube. With the blending tube empty the powder blender is thus essentially mass balanced or pivoted on the blender support, for example via a blender frame. The support forms a pivoting point or line, with essentially equal weight on both sides of the pivoting point or line. Such a pivoted or balanced support of the powder blender has the advantage that for example a weight sensor, like for example a load cell sensor, arranged for example underneath the powder blender, like underneath the blending tube or underneath a blender frame, measures no or only a very small load when the blending tube is empty, i.e. no or only very small dead weight is present. More specifically, dead weight of the blender, such as through the blender tube and the blending devices, is compensated such that the balancing is achieved and a weight sensor only measures useful weight of powder product. The compensation can be effected for example with other components, such as actuators, like drives. The weight sensor essentially only measures the useful weight of the powder product when powder product is present in the blending tube. This increases the accurateness of the weight measurement since a more sensitive weight sensor, like a weight sensor with a smaller weighing range, may be used.

The invention further solves the above object with a feeding and blending system for a system for processing of powder products, preferably for continuous processing of powder products, the feeding and blending system comprising at least two system inlets for powder products and at least two feeding and dosing devices, each having an inlet being connected with a system inlet, further comprising at least one powder blender according to the invention, the feeding and dosing devices each having an outlet being connected with at least one inlet of the powder blender.

The general configuration of the feeding and blending system has already been explained above. As indicated, powder products fed via the system inlets may for example be API's, excipients and/or lubricants. The feeding and blending system may also have more than two system inlets for more than two different powder products to be processed. The feeding and dosing devices may for example comprise loss in weight feeders. Such loss in weight feeders are generally known to the person skilled in the art and thus do not need to be explained in detail. Generally, they feed and dose powder product based on measuring results of a weight sensor. The feeding and dosing devices usually comprise actuators for actuating the feeders, like drives for driving the feeders. Usually, each feeding and dosing device is in connection with one system inlet through which the respective powder product is introduced into the system. As already explained, the powder blender may comprise one or more than one inlet. Outlets of different feeding and dosing devices may be connected with the same inlet of the powder blender. However, it is also possible that outlets of different feeding and dosing devices are connected with different inlets of the powder blender.

The inventive feeding and blending system may comprise more than two feeding and dosing devices, for example three, four, five, six or more than six feeding and dosing devices. The feeding and dosing devices may be arranged in a row. More specifically, the feeding and dosing devices may be arranged essentially along a straight line, particularly a horizontal line, thus not in a circular set up. Of course, depending on the number of feeding and dosing devices, it would also be possible to arrange them along more than one row. If more than one row of feeding and dosing devices is provided the rows may be arranged for example along parallel horizontal axes.

According to an embodiment, the feeding and blending system may further comprise automatic refill systems for automatically refilling the feeders with powder product. According to a further embodiment, the automatic refill systems may each comprise a horizontal refill screw, each arranged above a feeding and dosing device, in particular above a feeder of the feeding and dosing device. The automatic refill systems are arranged between system inlets and the feeding and dosing devices, in particular the feeders of the feeding and dosing devices. Powder products introduced via the system inlets are fed to the automatic refill systems, in particular their horizontal refill screws which are driven by a drive, such as an electric motor. Thereby, the powder products are fed to the dosing and feeding devices, in particular the feeders, from which they are fed to the powder blender. The automatic refill systems may be in contact with powder product reservoirs via the system inlets and serve to automatically refill the feeders when necessary.

According to a further embodiment at least one funnel or hopper may be provided between the feeding and dosing devices, particularly the feeders, and the powder blender, said at least one funnel or hopper having a funnel or hopper inlet being connected with at least two outlets of the feeding and dosing devices, and having an outlet being connected with an inlet of the powder blender. The funnel or hopper may for example have a conical shape, having a larger inlet than outlet. Providing such a funnel or hopper allows combining product flows coming from outlets of different feeding and dosing devices into one inlet of the powder blender in a particularly easy manner.

The invention further solves the above object with a system for processing of powder products, preferably for continuous processing of powder products, comprising a feeding and blending system according to the invention, further comprising a production machine, wherein the production machine comprises an inlet being connected with the at least one outlet of the powder blender, and wherein the production machine comprises an outlet.

The system has already generally been explained above. It is possible that the feeding and blending system and the production machine are arranged on the same level, in particular the same floor level. The system may thus be a one-floor system. However, it would also be possible to arrange for example the feeding and dosing system above the production machine, in particular on an upper floor level, thus effectively providing a two-floor system. The production machine continuously processes the product mixture produced in the powder blender, and discharges the processed products at the outlet. As explained above, the system is a continuously working system. The system may be a contained system, for example with a containment level for product toxicity level OEB 3 or higher, measured for example according to the SMEPAC test (Standardized Measurement of Equipment Particulate Airborne Concentration).

A product conveying device may be positioned in a connection between the outlet of the powder blender and the inlet of the production machine, said product conveying device conveying the product mixture from the outlet of the powder blender to the inlet of the production machine.

According to a further embodiment the continuous processing of powder products may be a continuous production of solid dosage forms in direct processing, wherein the production machine may be for continuously producing solid dosage forms from the product mixture, wherein the outlet of the production machine is an outlet for discharging produced solid dosage forms. The production machine may preferably be a tablet press or a capsule filling machine. The solid dosage forms may accordingly be tablets or capsules. The tablet press may in particular be a rotary tablet press. However, the production machine may also be a different production machine, such as a granulating device. The system may also comprise more than one production machines and/or more than one feeding and blending systems.

BRIEF DESCRIPTION OF THE DRAWINGS

Embodiments of the invention are explained in more detail below with reference to the drawings. The drawings schematically show.

In the drawings the same reference numerals shall denote the same parts.

DETAILED DESCRIPTION OF THE INVENTION

Figure 1:
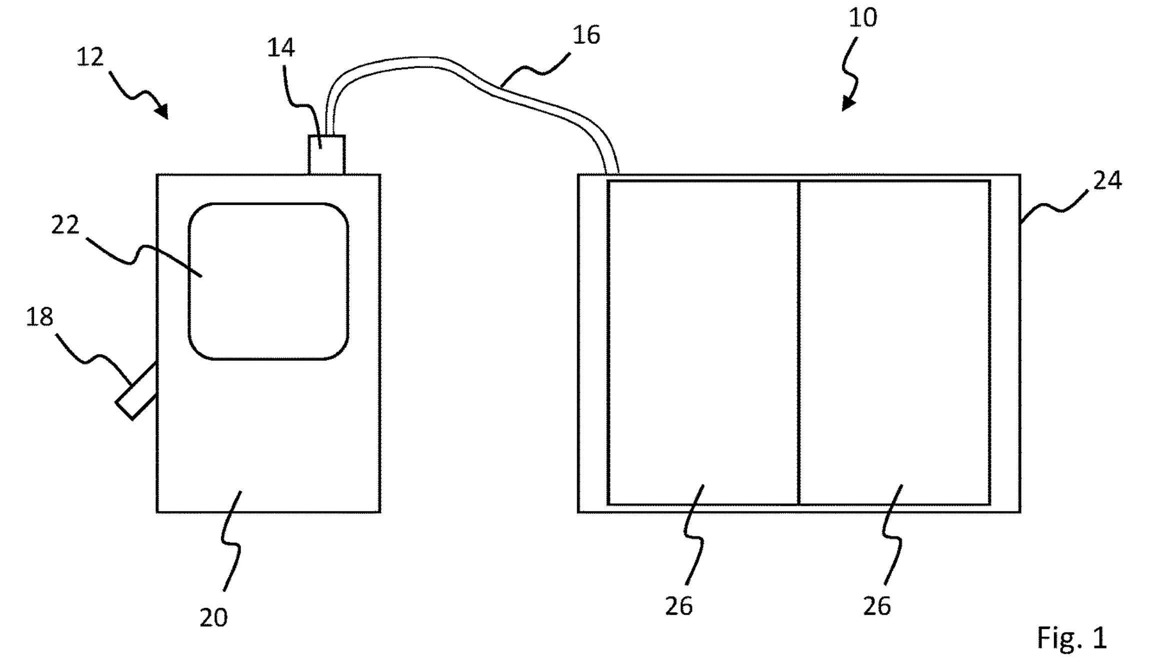
FIG. 1 illustrates a side view of an embodiment of a system for continuous processing powder products.

The system for continuous processing of powder products shown in FIG. 1 is a system for continuous production of solid dosage forms in direct processing. The system comprises a feeding and blending system 10 and a production machine 12, for example a tablet press, such as a rotary tablet press, or a capsule filling machine. The production machine 12 comprises an inlet 14 which is connected with a hose 16 of a product conveying device conveying a product mixture from the feeding and blending system 10 to the inlet 14 of the production machine 12, where the product mixture is continuously processed to solid dosage forms, such as tablets or capsules. The produced solid dosage forms are discharged via an outlet 18 of the production machine 12. The production machine 12 comprises a machine housing 20 with a window 22. The feeding and blending system 10 comprises a system housing 24 with two doors 26, which are opened in FIG. 2 to view the internal parts of the feeding and blending system 10. The system shown in FIG. 1 is a one-floor arrangement where the feeding and blending system 10 and the production machine 12 are provided on the same level, in particular the same floor level.

Figure 2:
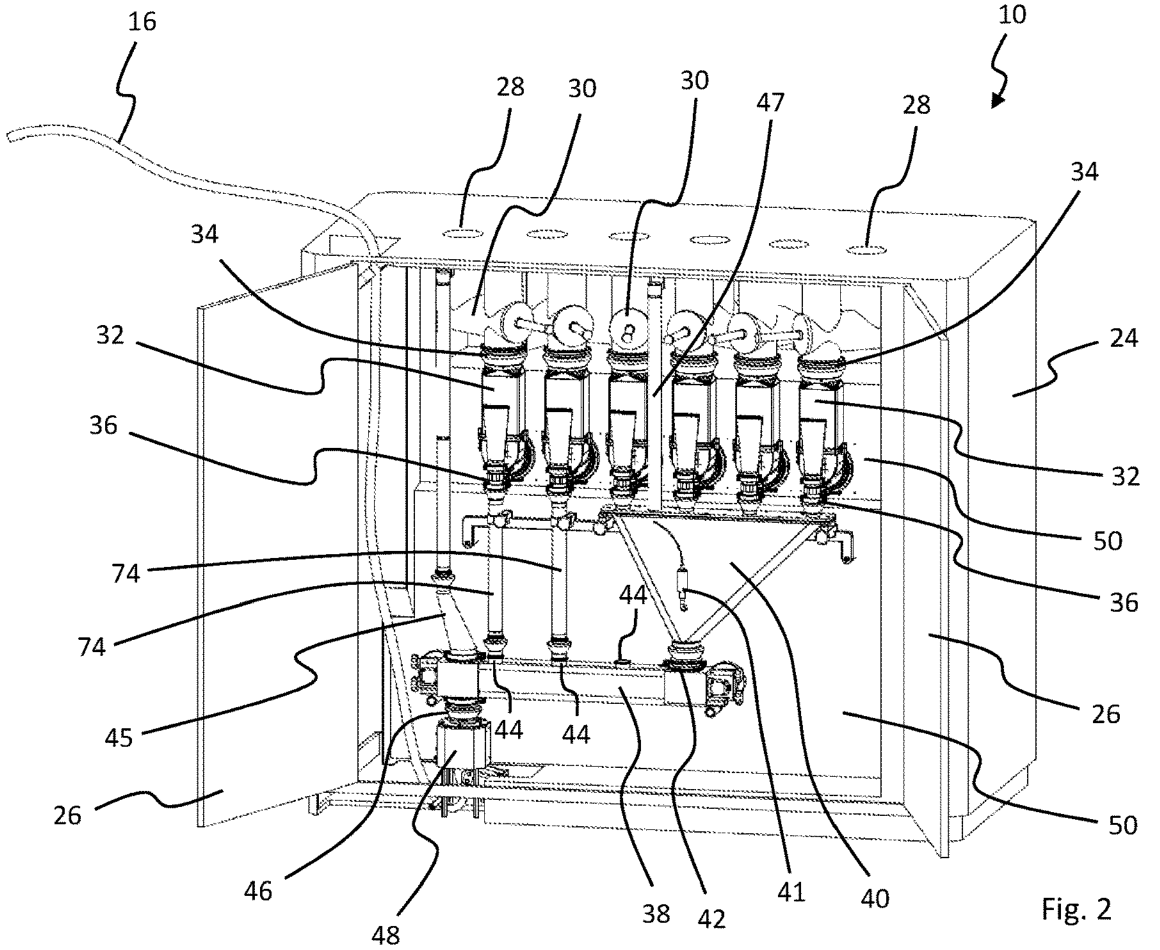
FIG. 2 illustrates a perspective view of an embodiment of a feeding and blending system of the system shown in FIG. 1.
Figure 3:
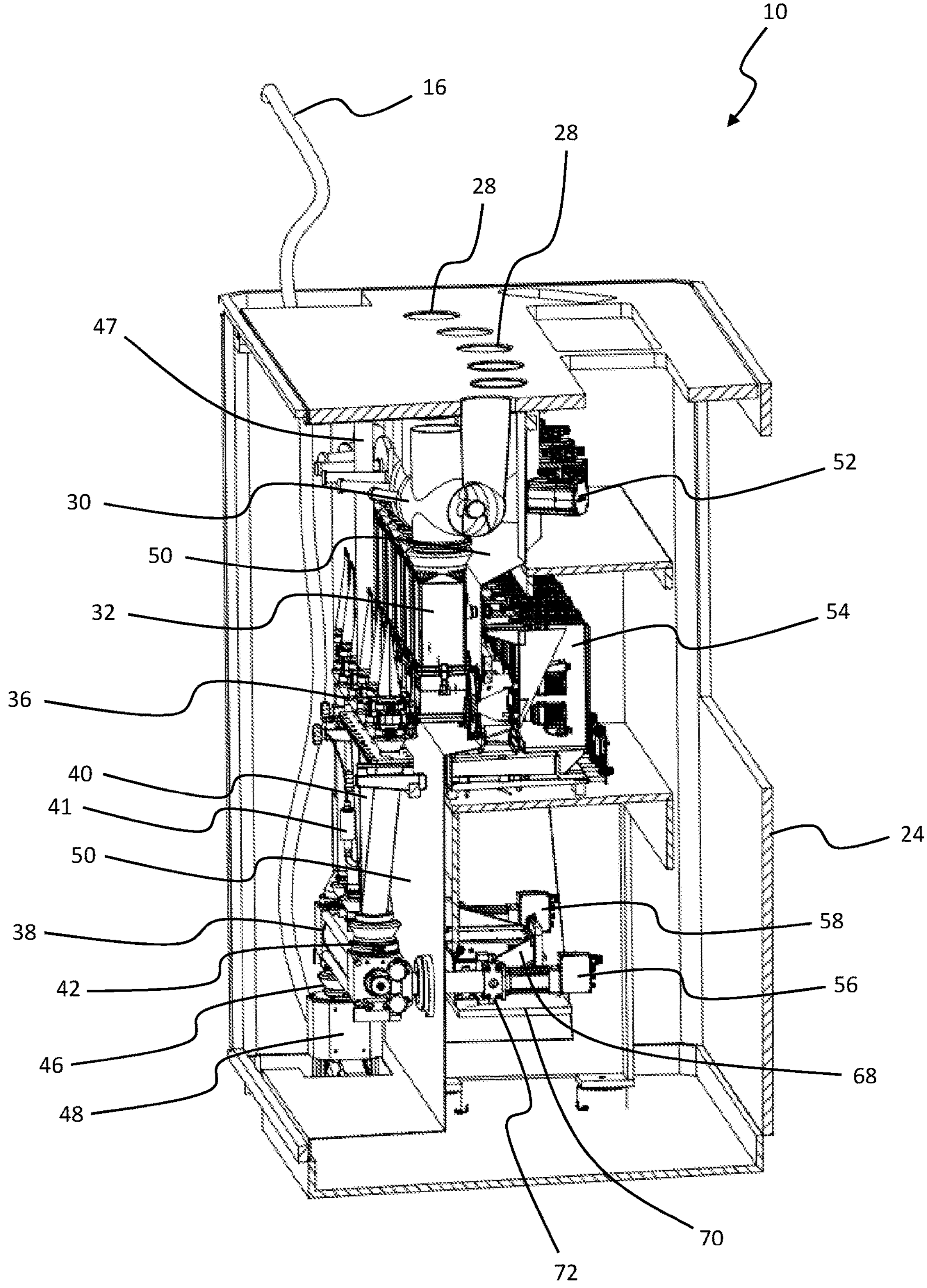
FIG. 3 illustrates another perspective view of an embodiment of the feeding and blending system of the system shown in FIG. 1.

In FIGS. 2 and 3, six (6) system inlets 28 can be seen via which different powder products can be introduced into the feeding and blending system 10. The system inlets 28 lead to six (6) automatic refill systems, each comprising a horizontal refill screw 30. As can be seen in FIGS. 2 and 3, feeding and dosing devices, in particular feeders 32, are arranged in a row, in particular along a horizontal line. The feeding and dosing devices, in particular the feeders 32, each comprise an inlet 34 arranged between the refill screws 30 and the feeders 32. The feeding and dosing devices, in particular the feeders 32, further each comprise an outlet 36 for feeding a powder product supplied via the inlets 28 and the refill units 30 to a powder blender 38. The powder blender 38 comprises a horizontal blending tube 39 for blending the different powder products to the desired product mixture. In the example shown in the drawings, a funnel or hopper 40 is arranged between the feeders 32 and the powder blender 38, said funnel or hopper 40 combining product streams from four of the six feeders 32 into one product stream and into a first inlet 42 of the powder blender 38. The funnel or hopper 40 may be provided with a vibration device 41 for promoting powder flow in the funnel or hopper 40. The powder blender 38 comprises further inlets 44 through which powder streams from further feeders 32 can be introduced into the powder blender 38 for example via vertical tubes 74. A venting pipe 45 is provided on the end opposite inlet 42 of the powder blender 38 for venting air into the environment. A similar venting pipe 47 is provided at the top of the funnel or hopper 40. The powder blender 38 further comprises an outlet 46 through which the produced product mixture is provided to a blender outlet hopper 48, from which the product mixture is conveyed via hose 16 to the inlet 14 of the production machine 12 for further processing. The blender outlet hopper 48 can be used in mini-batch blending processes.

A separation wall 50 is provided inside system housing 24 separating a process area, seen in FIG. 2, and seen in FIG. 3 on the left-hand side, from a technical area, positioned behind separation wall 50 in FIG. 2, and seen in FIG. 3 on the right-hand side. This separation wall 50 may provide a contained or dust tight separation between the process area and the technical area. In the process area process components of the automatic refill systems, the feeding and dosing devices and the powder blender are arranged which come into direct contact with the powder products to be processed. In the technical area, technical components of the automatic refill systems, the feeding and dosing devices, and the powder blender are arranged which do not come into direct contact with the powder products. In the case at hand these technical components comprise actuators 52 for actuating the refill screws 30, in the example shown drives 52 for driving the refill screws 30, actuators 54 for actuating the feeders 32, in the example shown drives 54 for driving the feeders 32, and a first actuator 56 and a second actuator 58 for actuating the powder blender 38, in the example shown a first drive 56 and a second drive 58 for driving the powder blender 38. The drives 52, 54, 56, 58 may comprise for example electric motors. The connection between the technical components, such as the drives 52, 54, 56 and 58, and the process components, such as the refill screws 30, the feeders 32, and the powder blender 38, are arranged in a through the wall technique through the separation wall 50. For easier installation and maintenance these connections may be quick release connections. While the system housing 24 provides a protective housing 24 the separation wall 50 securely separates the process area, in which the powder products are handled, from the technical area, where no powder products shall be present. In this manner on the one hand an intrinsic containment can be achieved of the process area in comparison to the technical area, and on the other hand a containment towards the environment can be achieved through the protective housing 24. Also, the housing 20 of the production machine 12 may provide containment towards the environment, as generally explained above.

Figure 4:
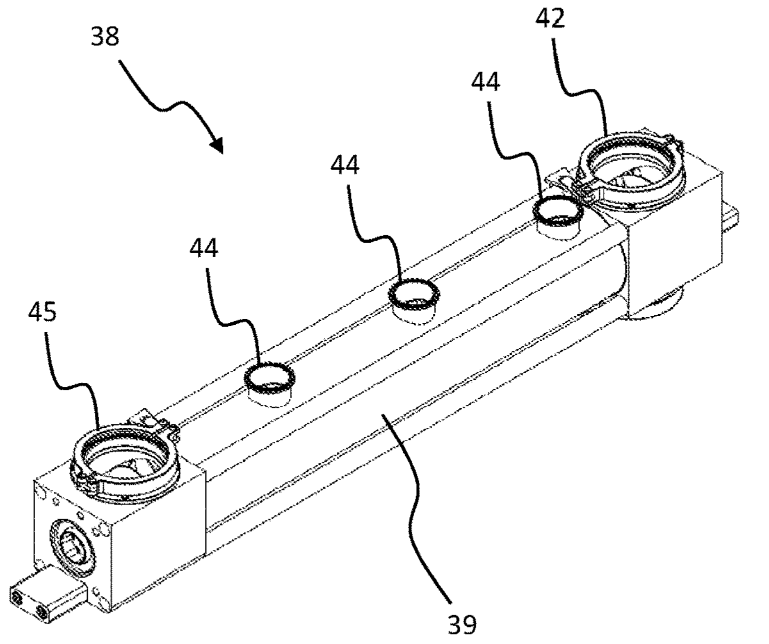
FIG. 4 illustrates a perspective view of an embodiment of a powder blender of the feeding and blending system shown in FIGS. 2 and 3.
Figure 5:
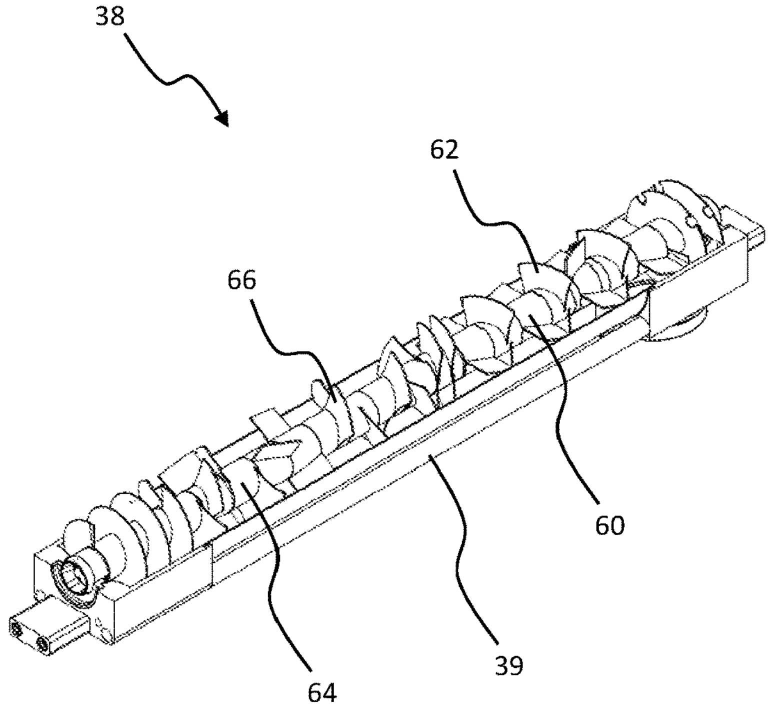
FIG. 5 illustrates a perspective view of the embodiment of the powder blender of FIG. 4 with the housing partially removed.
Figure 6:
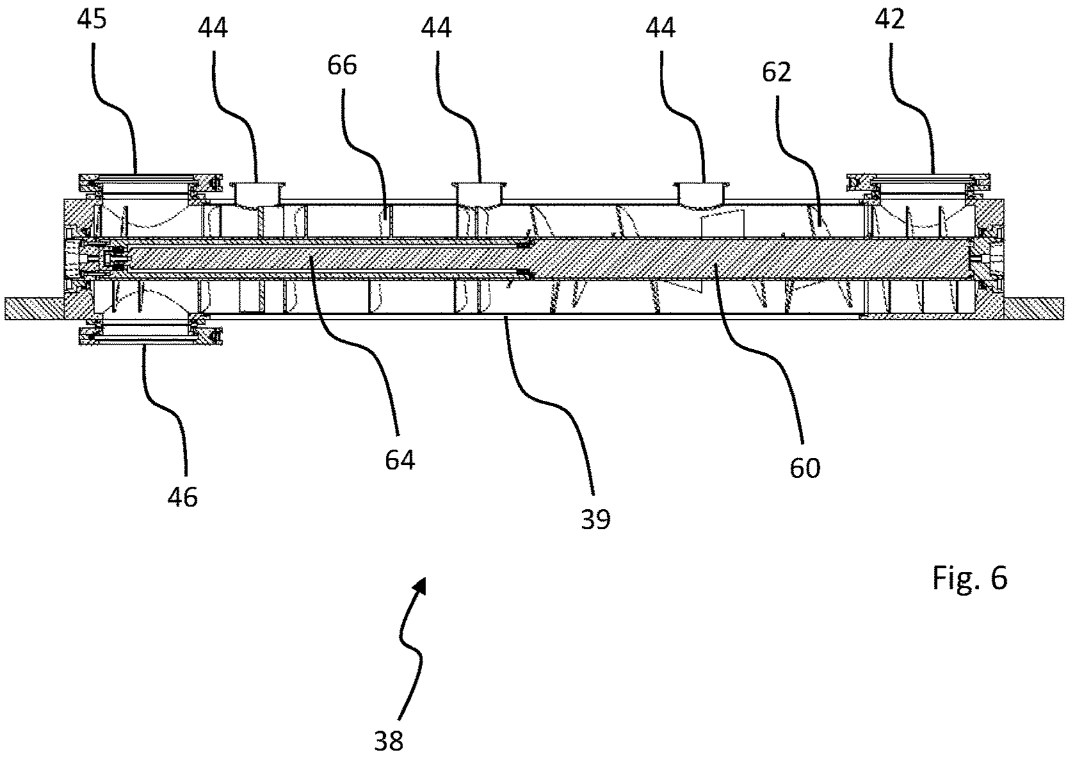
FIG. 6 illustrates a sectional view of the embodiment of the powder blender shown in FIG. 4.

From FIGS. 4 to 6 it can be seen that in the horizontal blending tube 39 of powder blender 38 a first blending shaft 60 with blending blades 62, and a second blending shaft 64, also with blending blades 66, are arranged. The blending shafts 60, 64 are arranged coaxially successively along the longitudinal axis of the blending tube 39 of the powder blender 38, which in FIG. 5 runs horizontally. In the case at hand the first and second blending shafts 60, 64 define two successive blending zones along the longitudinal axis of the blending tube 39 of the powder blender 38, wherein in the example shown the blending zones have approximately the same length. Of course the lengths could also be different. The first drive 56 serves to rotate the first blending shaft 60 about its longitudinal axis, and the second drive 58 serves to rotate the second blending shaft 64 about its longitudinal axis. The drives 56, 58 are designed to drive the first and second blending shafts 60, 64 independently from one another. In particular, it is possible to drive the first and second blending shafts 60, 64 with different rotational speed and/or different rotational direction. In the case at hand powder products introduced into the blending tube 39 of the powder blender 38 are conveyed through the blending tube 39 first through the first blending zone, defined by the first blending shaft 60, and subsequently through the second blending zone defined by the second blending shaft 64, in FIG. 6 thus from right to left. After having been conveyed through the blending tube 39 the blended powder mixture is discharged via outlet 46.

The ability to control rotation of the blending shafts 60, 64 independently from one another allows for a flexible adaptation to the process, in particular the powder products to be processed, and optimises the blending result, such as blend uniformity. One or both of the blending shafts 60, 64 may be provided with a quick release connection to be easily removable and replaceable with a different blending shaft which may have a different geometry of blending blades, thus allowing to adapt the powder blender 38 easily for different blending processes.

The powder blender 38 may further be provided with a load cell measuring the mass of powder product in the blending tube 39. A control unit of the inventive system, integrated for example into the production machine 12, can control the drives 56, 58, and thus the blending shafts 60, 64 on basis of measurement results of the load cell sensor. As can be seen specifically in FIG. 3 the powder blender 38 with blending tube 39 is supported via a blender frame 68 on a support plate 70. The support location can be seen at reference numeral 72 for the connection between drive 56 and the first blending shaft 60, wherein a corresponding support location is present between drive 58 and second blending shaft 64, not seen in FIG. 3. The support via the blender frame 68 on the support plate 70 is such that a load cell sensor measures no or only a small load when the blending tube is empty, i.e. no powder product is present in the blending tube. In FIG. 3, the mass of the powder blender 38 including the drives 56, 58, the frame 68 and the respective connections is essentially the same on both sides of the support locations 72, in FIG. 3 right and left of the support locations 72. This arrangement allows using a more sensitive load cell sensor, thus providing higher measurement accuracy. A load cell sensor can for example be provided on or underneath the blending tube 39 or on or underneath the blender frame 70.

Figure 7:
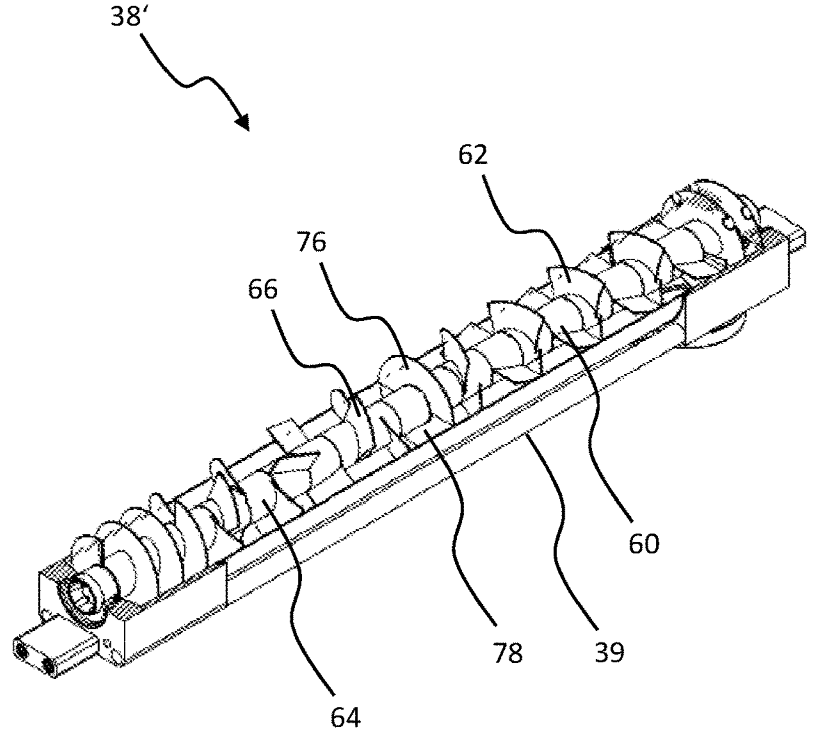
FIG. 7 illustrates a perspective view of another embodiment of a powder blender with the housing partially removed.

FIG. 7 shows a further embodiment of a powder blender 38' of an inventive feeding and blending system. The powder blender 38' shown in FIG. 7 corresponds largely to the powder blender 38 shown in FIGS. 4 to 6. It can be used in the same manner in the inventive feeding and blending system 10 shown in FIGS. 2 and 3 and the inventive system for continuous processing powder products shown in FIG. 1 as the powder blender 38 shown in FIGS. 4 to 6.

The powder blender 38' shown in FIG. 7 merely differs from the powder blender 38 shown in FIGS. 4 to 6 in having an adjustable overflow device arranged in the blending tube 39 between the first and second blending devices for allowing an adjustable mass of powder product to flow over the overflow device. The overflow device in the example shown in FIG. 7 comprises two rotatable overflow plates 76, 78, both in the shape of a half circle. By rotating at least one of the overflow plates 76, 78 the mass of powder product flowing over the overflow plates 76, 78 can be adjusted. For example, when the rotational position of the overflow plates 76, 78 is such that the two half circles form a full circle, like shown in FIG. 7, the flow of powder product over the overflow plates 76, 78 can be fully shut off. By rotating at least one overflow plate 76,78 out of the full circle, an adjustable amount of powder product can pass the overflow plates 76, 78.

LIST OF REFERENCE NUMERALS

10 feeding and blending system
12 production machine
14 inlet of the production machine
16 hose
18 outlet of the production machine
20 machine housing
22 window
24 system housing
26 doors
28 system inlets
30 refill screws
32 feeders
34 inlets of feeders
36 outlet of feeders
38, 38' powder blender
39 blending tube
40 funnel or hopper
42, 44 inlets of powder blender
46 outlet of powder blender
45, 47 venting pipes
48 blender outlet hopper
50 separation wall
52 actuators/drives for refill screws
54 actuators/drives for feeders
56 first actuator/drive for powder blender
58 second actuator/drive for powder blender
60 first blending shaft
62 blending blades of first blending shaft
64 second blending shaft
66 blending blades of second blending shaft
68 blender frame
70 support plate
72 support location
74 vertical tubes
76, 78 overflow plates

The invention claimed is:

1. A powder blender for a system for continuous processing of powder products comprising:

a horizontal blending tube extending along an axis from a first end to a second end and comprising, at least one inlet configured to receive the powder products to be blended, and at least one outlet configured to discharge the powder products after blending;

at least two blending devices positioned in the horizontal blending tube and arranged successively along the axis of the horizontal blending tube;

at least two actuators, wherein each of the at least two actuators is configured to operate one of the at least two blending devices such that the at least two blending devices are actuated differently from each other; and an overflow device positioned in the horizontal blending tube, wherein one of the at least two blending devices is arranged upstream of another of the at least two blending devices, and wherein the overflow device is positioned between the at least two blending devices and configured for powder product to flow over the overflow device.

2. The powder blender according to claim 1, wherein the at least two blending devices each comprise a blending shaft extending along a longitudinal axis and configured to be rotated about the longitudinal axis by one of the at least two actuators.

3. The powder blender according to claim 2, wherein each of the at least two blending shafts comprises a plurality of blending blades configured to blend the powder products.

4. The powder blender according to claim 3, wherein each of the at least two blending shafts differ from each other in at least one of: (1) shape; (2) orientation; and (3) position of the blending blades.

5. The powder blender according to claim 4, wherein at least some of the blending blades are adaptable with regard to at least one of: (1) shape; (2) orientation; and (3) position.

6. The powder blender according to claim 2, wherein one end of a first blending shaft faces one end of a second blending shaft, and wherein the one ends of the first blending shaft and the second blending shaft are supported on each other.

7. The powder blender according to claim 1, wherein the at least two actuators are configured to actuate at least one of: (1) rotational speed; and (2) rotational direction of the at least two blending shafts differently from one another.

8. The powder blender according to claim 2, wherein at least one of the blending shafts is configured to be removed and replaced with a different blending shaft.

9. The powder blender according to claim 1, wherein the overflow device comprises at least one overflow plate configured to rotate, and wherein a mass of powder product flowing over the overflow device is adjusted by rotating the at least one overflow plate.

10. The powder blender according to claim 1, wherein at least one of: (1) the at least one inlet is positioned on an upper side of the horizontal blending tube; and (2) the at least one outlet is positioned at the lower side of the horizontal blending tube.

11. The powder blender according to claim 1, wherein the horizontal blending tube comprises at least two inlets, wherein at least one of the at least two inlets is positioned above a first blending device, and wherein one of the at least two inlets is positioned above a second blending device.

12. The powder blender according to claim 1, wherein the horizontal blending tube comprises a length and a diameter, and wherein a ratio of a size of the length relative to a size of the diameter is at least 5:1.

13. The powder blender according to claim 12, wherein the ratio is at least 7:1.

14. The powder blender according to claim 1, further comprising at least one sensor configured to measure a mass of powder product in the horizontal blending tube.

15. The powder blender according to claim 1, further comprising a blender support configured to support the powder blender, wherein the powder blender is balanced without powder product present in the horizontal blending tube.

16. The powder blender according to claim 1, wherein the at least two blending devices are actuated independent from each other.

17. A feeding and blending apparatus for a system for processing of powder products, the feeding and blending apparatus comprising:

at least two apparatus inlets configured to accept powder products into the feeding and blending apparatus;

at least one powder blender according to claim 1; and at least two feeding and dosing devices, each comprising, an inlet connected with one of the at least two apparatus inlets, and an outlet being connected to at least one inlet of the powder blender.

18. A system for processing of powder products comprising:

a feeding and blending apparatus according to claim 17; and a production machine comprising an inlet connected with the at least one outlet of the powder blender and an outlet.

* * * * *